Aug. 25, 1970     R. RADEBOLD ETAL     3,525,223
THERMODYNAMIC ROCKET PROCESS USING ALKALI METAL
FUELS IN A TWO PHASE FLOW
Filed March 29, 1968
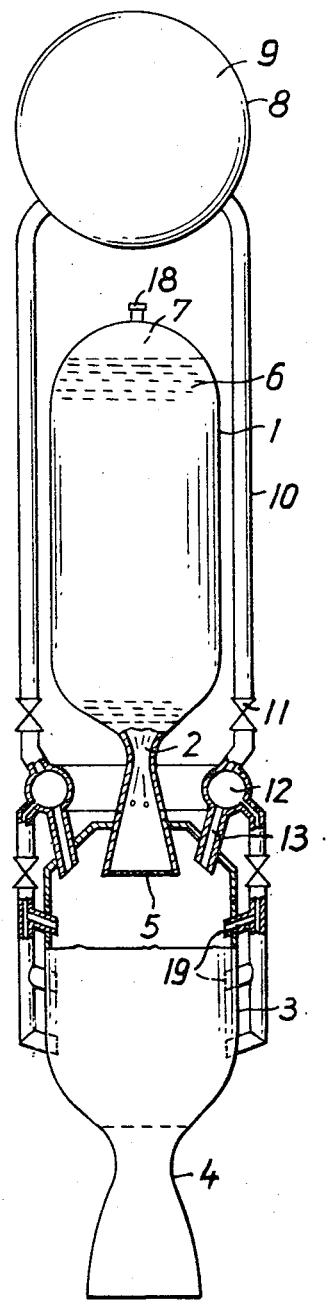
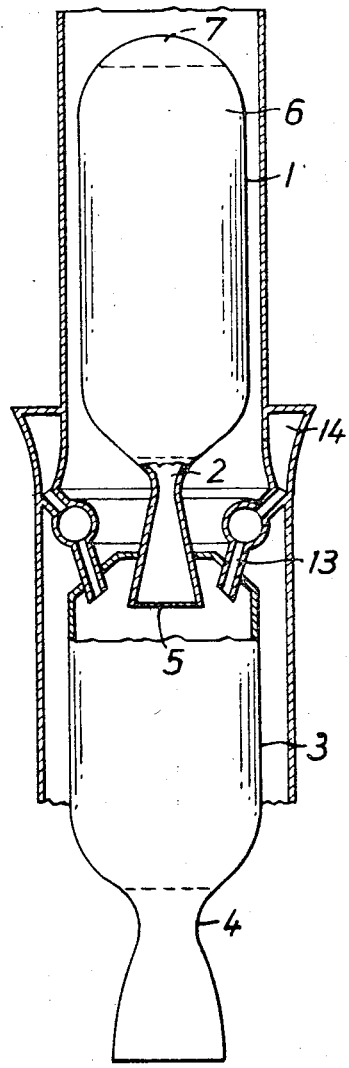
Inventors:
Reinhart Radebold
Hermann Lang
BY Spencer & Kaye
Attorneys Aug. 25, 1970     R. RADEBOLD ETAL     3,525,223
THERMODYNAMIC ROCKET PROCESS USING ALKALI METAL
FUELS IN A TWO PHASE FLOW
Filed March 29, 1968     2 Sheets-Sheet 2
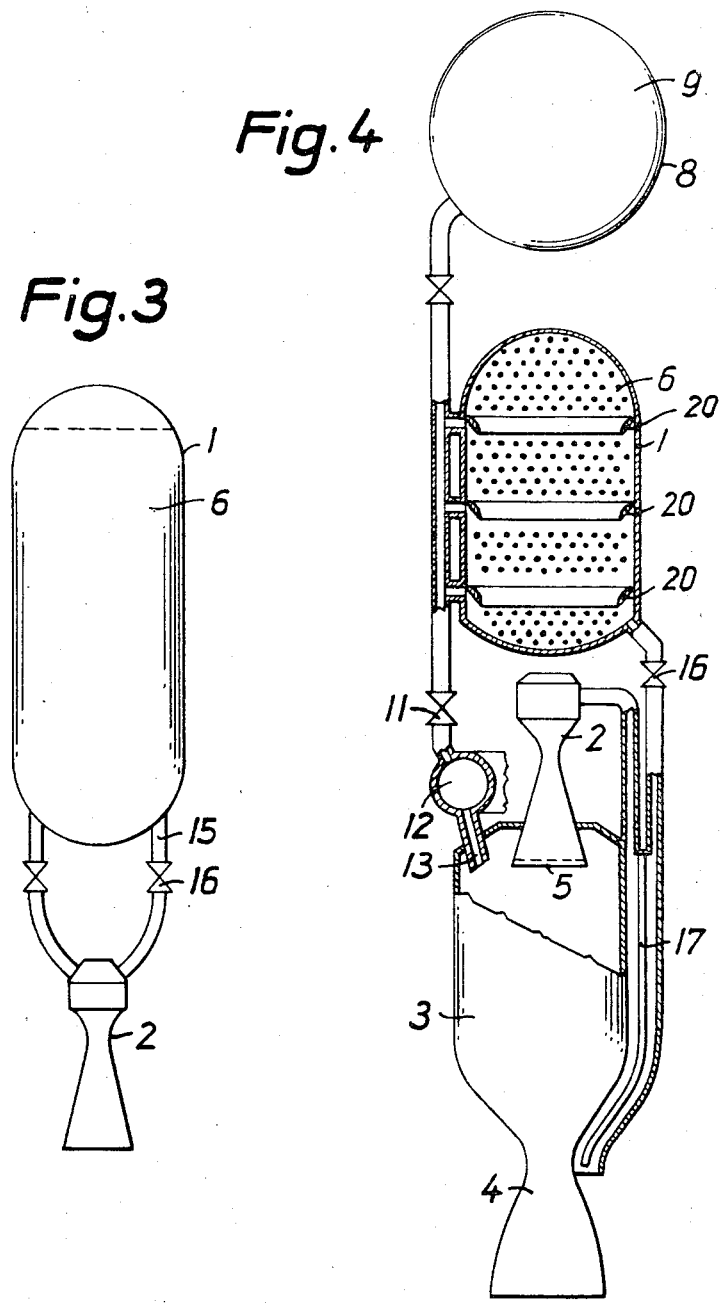
Inventors
Reinhart Radebold
Hermann Lang
BY Spencer & Kaye
Attorneys 3,525,223
THERMODYNAMIC ROCKET PROCESS USING ALKALI METAL FUELS IN A TWO PHASE FLOW
Reinhart Radebold and Hermann Lang, Berlin, Germany, assignors to Licentia Patent-Verwaltungs—G.m.b.H., Frankfurt am Main, Germany
Filed Mar. 29, 1968, Ser. No. 717,287
Claims priority, application Germany, Apr. 1, 1967, L 56,149; July 11, 1967, L 56,963
Int. Cl. F23r 1/04
U.S. Cl. 60—206   23 Claims

ABSTRACT OF THE DISCLOSURE

A thermodynamic reaction drive or rocket engine which employs liquefiable solid propellant. An alkali metal, which is used as the propellant, is stored in the fuel tank of the rocket engine in the solid state and then, whenever engine operation is desired, liquefied by heating to the necessary temperature. The liquid propellant is fed from the fuel tank through a De Laval nozzle into the mixing or combustion chamber where it is combined with an oxidizer. The propellant, which can be forced through the nozzle primarily by means of its own vapor pressure, is changed over at the nozzle into a two-phase flow. The oxidizer, which is simultaneously introduced into the mixing chamber at a higher pressure than the pressure in the chamber, effects the combustion of the propellant so that the internal energy of the products of combustion may be converted to kinetic energy in an appropriate thrust nozzle.

BACKGROUND OF THE INVENTION

The present invention relates to a thermodynamic reaction drive or rocket engine.

The rocket engines known in the art, which are used, for example, in spacecraft, operate with either solid or liquid propellants. Solid propellants have the disadvantage that, once the rocket engine is ignited, its thrust can not be controlled and must continue until all of the propellant has been oxidized. A rocket engine utilizing liquid propellant can, in fact, be controlled by apportioning, e.g., by means of pumps, the amount of propellant which is permitted to react. The utilization of liquid propellant such as liquid hydrogen and oxygen, however, requires that certain safety measures be taken to avoid explosions. A further disadvantage of the liquid propellant rocket engine is that, when installed in a spacecraft, it requires an extensive ground installation and, because the liquid propellant can not continuously be maintained in the engine's fuel tanks, it requires an elaborate starting procedure.

It is also known in the art to employ as a propellant a mixture of a metal powder and a liquid reaction partner. To guarantee a homogeneous mix this propellant mixture is embedded in a gel which is normally solid but which becomes fluid or forms an emulsion when it is pumped to be injected into the combustion chamber. However, even this type of rocket engine requires considerable technical effort in its design and construction.

SUMMARY OF THE INVENTION

An object of the present invention, therefore, is to provide a thermodynamic reaction drive, or, in particular, a rocket engine for spacecraft, which does not admit of the disadvantages described above and which may be realized by apparatus which is relatively easy to construct.

This, as well as other objects which will become apparent in the discussion that follows, is achieved, according to the present invention, by employing an alkali metal as the propellant. This propellant is stored in the rocket engine fuel tank in the solid state and then, when engine operation is desired, liquefied by heating to the necessary temperature. The liquid propellant is fed from the fuel tank through a De Laval nozzle into the mixing or combustion chamber where it is combined with an oxidizer. The propellant, which can be forced through the nozzle primarily by means of its own vapor pressure, is changed over at the nozzle into a two-phase flow. The oxidizer, which is simultaneously introduced into the mixing chamber at a higher pressure than the pressure into the chamber, effects the combustion of the propellant so that the internal energy of the products of combustion may be converted to kinetic energy in an appropriate thrust nozzle.

BRIEF DESCRIPTION OF THE DRAWINGS

FIG. 1 is a schematic diagram of rocket engine apparatus according to one preferred embodiment of the present invention.

FIG. 2 is a schematic diagram of rocket engine apparatus according to another preferred embodiment of the present invention.

FIG. 3 is a schematic diagram of the propellant injection portion of rocket engine apparatus according to another preferred embodiment of the present invention.

FIG. 4 is a schematic diagram of rocket engine apparatus according to another preferred embodiment of the present invention.

DESCRIPTION OF THE PREFERRED EMBODIMENTS

Referring now to the drawings, FIG. 1 illustrates one embodiment of the rocket engine apparatus according to the present invention. The fuel tank 1 in FIG. 1 is connected via a De Laval or converging-diverging nozzle 2 with a mixing or, in this case, combustion chamber 3. The De Laval nozzle projects into the combustion chamber. A thrust nozzle 4, which is likewise constructed as a De Laval nozzle, is attached to the combustion chamber 3. The fuel or propellant 6 which may, for example, be potassium, is introduced into the fuel tank in the liquid state and allowed to solidify. The De Laval nozzle 2 is initially closed in the manner known in the art by a diaphragm 5 held in a groove in the nozzle periphery.

If the potassium propellant in the fuel tank is brought to a temperature of about 900° C. by means of heating apparatus, not shown, it will liquefy and, with the engine apparatus arranged in the vertical position, will form a space 7 at the top of the tank that has a pressure of approximately 20 atmospheres.

The notch in which the diaphragm 5 is mounted is so dimensioned that the diaphragm will automatically blow off at this pressure. The liquid potassium will then enter the mixing chamber in finely distributed droplets. A thermodynamic atomization of the potassium will take place as a result of its own steam. If it be assumed that the expansion in the De Laval nozzle 2 is adiabatic, it follows that small bubbles of superheated steam will be produced as a result of the pressure drop, which bubbles will distribute the kinetic energy of the fluid as they expand forming an almost homogeneous two-phase flow. This thermodynamic atomization can thus provide about 20% of the total thrust of the rocket engine; that is, sufficient thrust to cause the engine to hover.

The oxidizing agent or oxidizer 9 in the container 8 is led through regulator valves 11, a collecting ring 12 and the injector nozzles 13 into the combustion chamber. The nozzles 13 can be arranged in a ring, for example, in the manner well-known in the art. If necessary, the oxidizer may be pre-heated prior to injection so that its pressure will lie above the ambient pressure in the combustion chamber.

The internal energy of the products of combustion produced by the oxidation will be converted into kinetic energy in the thrust nozzle 4.

A halogen is preferably employed as oxidizing agent in this rocket engine. By using a halogen, fluorine or chlorine, in particular, it is possible to obtain the necessary vapor pressure by pre-heating, as mentioned above, making it unnecessary to employ injection pumps.

It is possible to use any substance as an oxidizer which will react with the alkali metal used as fuel. Some of the other oxidizers which will spontaneously react with an alkali metal are oxygen, halogen and alcohol.

The oxidation of the propellant can also be achieved using environmental oxygen during flights in the region of the earth's atmosphere. The necessary pressure can, in this case, be developed by means of an air-catching diffusor 14 as illustrated in FIG. 2. The starting speed of the rocket engine which is required to render the diffusor operative can be produced, for example, by an initial rocket stage or by some other well-known means for accelerating the apparatus on the ground.

It is possible also to provide the engine shown in FIG. 2 with the additional oxidizing apparatus of the type illustrated in FIG. 1 so that a halogen can again be used as the oxidizer outside the atmosphere. The utilization of a diffusor makes it possible to exclude an otherwise necessary quantity of oxidizing agent and thus considerably reduce the take-off weight of the spacecraft.

The utilization of an alkaline metal as the propellant, according to the present invention, permits the thrust of the rocket engine to be switched off or controlled in an advantageous manner. FIG. 3 illustrates one embodiment of the propellant supply system by which this may be accomplished. In this embodiment the propellant 6 is supplied to the De Laval nozzle 2 from the fuel tank 1 through lines 15 and regulating valves 16. This type of propellant supply system does not reduce the efficiency of the rocket engine. The combustion chamber and the oxidizer supply system have not been included in FIG. 3 in the interest of clarity.

In a further advantageous embodiment of the present invention the alkaline metal consists of a homogeneous mixture of two alkali elements, one of which, the principal constituent, has a higher specific heat of reaction and a higher boiling temperature than the other, secondary constituent. The secondary constituent thus effects the thermodynamic atomization of the principal constituent, whereas the heat of reaction of the latter delivers the main thrust of the rocket engine. The temperature of the fuel tank during operation is so chosen, in dependence upon the pressure in the mixing chamber, that the secondary constituent boils when it expands in the De Laval nozzle and causes the principal constituent to atomize.

A mixture of potassium and lithium provides especially good results as a two-constituent propellant. A 10–20% share of potassium in the total mixture is sufficient here to uniformly and finally atomize the lithium.

According to a still further embodiment of the present invention the propellant may also be inserted into the mixing chamber with the aid of a separate gas. This measure allows the operating temperature of the propellant to be reduced. If the gas, which, for example, may be argon, is employed at a pressure of about 20 atmospheres the normally necessary propellant's temperature of 900° C. may be reduced to approximately 600° C. This gas may be introduced into the fuel tank 1 through an inlet 18 at the top of the tank, as shown in FIG. 1, after the propellant has been liquefied.

It is possible to increase the thrust of the rocket engine if the expansion in the thrust nozzle is made essentially isothermal. This can be achieved by providing a number of oxidizer inlet openings 19 along the longitudinal surface of the combustion chamber so that the combustion process is continued up to the exit opening of the thrust nozzle, as shown in FIG. 1.

The heat generated by the rays of the sun on a launching pad may, for example, be sufficient to liquefy the propellant. In regions where a sufficient amount of solar energy is not normally available it is possible, according to another embodiment of the present invention, to introduce a halogen oxidizer into the solid propellant to liquefy it and raise it to a higher temperature. It is also practical, in addition, to lead the liquefied propellant through a heat exchanger formed by the external surface of the combustion chamber to further increase its temperature before it enters the De Laval nozzle.

A rocket engine constructed according to this embodiment is schematically illustrated in FIG. 4.

Assuming that the propellant 6 is present in the fuel tank 1 in the liquid state, this propellant can pass through the valve 16 into a heat exchanger 17 which consists of an external wall, a guide plate, and the external surface of the combustion chamber 3. When the propellant emerges from the heat exchanger it has attained the temperature of 800 to 1000° C. which is necessary for the operation of the engine.

To bring the rocket engine into the state of operational readiness the initially solid propellant 6 is liquefied by a halogen which serves as an oxidizer. The propellant may be heated in this way, for example, to a mean temperature of about 200 to 300° C. The halogen may, for example, be introduced through the holes in the fuel tank and in the solid alkali metal.

In the embodiment shown in FIG. 4 the internal wall of the fuel tank is provided with distributing rings 18. If the propellant be introduced into the fuel tank in the liquid state through an opening, not shown, at the lower end of the tank, an overpressure formed by the rings will create cavities inside these rings in the region of the tank wall. Closable side openings in the container wall next to these cavities permit the introduction of the halogen, preferably fluorine, when the engine is to be brought into operational readiness. The resultant liberated heat of oxidation liquefies the propellant and brings it up to a mean temperature. It is advantageous if the same halogen which is used to liquefy the propellant be also used for the reaction in the combustion chamber.

The embodiment illustrated in FIG. 4 and described above is additionally advantageous in that it permits a considerable reduction in the thickness of the wall of the fuel tank and therefore in the weight of the rocket engine. This embodiment simultaneously affords an advantageous cooling of the mixing chamber.

It will be understood that the above description of the present invention is susceptible to various modifications, changes, and adaptations, and the same are intended to be comprehended within the meaning and range of equivalents of the appended claims.

What is claimed is:

1. A method of converting the internal energy of a propellant into kinetic energy comprising the steps of:
   (a) heating an alkali metal propellant which is present in a fuel tank at least sufficiently to cause said propellant to become liquid:
   (b) discharging said propellant from said fuel tank in a two-phase liquid-gas flow into a mixing chamber through a De Laval nozzle; and
   (c) introducing an oxidizer into said mixing chamber.

2. The method defined in claim 1, wherein said propellant and said oxidizer are allowed to react in said mixing chamber.

3. The method defined in claim 1, wherein said propellant is discharged through said De Laval nozzle at least in part under the force of its own vapor pressure in said fuel tank.

4. The method defined in claim 1, wherein said propellant is discharged through said De Laval nozzle at least in part under the force of a separate gas under pressure in said fuel tank.

5. The method defined in claim 4, wherein said separate gas is argon and said argon is present in said fuel tank at a pressure in the range of 10–20 atmospheres.

6. The method defined in claim 1, wherein said propellant is heated to a temperature substantially above the melting point thereof, thereby to increase its vapor pressure in said fuel tank.

7. The method defined in claim 1, wherein said propellant is discharged through said De Laval nozzle entirely under the force of its own vapor pressure in said fuel tank.

8. The method defined in claim 1, wherein said propellant comprises a homogeneous mixture of two alkali metals, one of said two metals having a higher specific heat of reaction and a higher boiling temperature than the other of said two metals.

9. The method defined in claim 8, wherein said one metal comprises more than half of said mixture.

10. The method defined in claim 8, wherein said propellant is heated to a temperature which will cause said other metal to boil as a result of its expansion during said discharge through said De Laval nozzle.

11. The method defined in claim 8, wherein said one metal is lithium and said other metal is potassium.

12. The method defined in claim 11, wherein said mixture consists of 80–90% lithium and 20–10% potassium.

13. The method defined in claim 1, wherein said oxidizer is a halogen.

14. The method defined in claim 13, wherein said oxidizer is chlorine.

15. The method defined in claim 13, wherein said oxidizer is fluorine.

16. The method defined in claim 1, wherein said oxidizer is air.

17. The method defined in claim 16, comprising the further step of catching said air in a diffusor while moving through the earth's atmosphere.

18. The method defined in claim 1, comprising the further step of heating said oxidizer prior to introducing it into said mixing chamber.

19. The method defined in claim 1, wherein said propellant is heated by introducing an oxidizer into said fuel tank.

20. The method defined in claim 19, wherein said oxidizer is a halogen.

21. The method defined in claim 19, wherein said propellant is heated by said oxidizer to a first temperature above the melting point of said propellant and then heated to a second temperature higher than said one temperature prior to discharge through said De Laval nozzle by passing it through a heat exchanger formed, in part, by the external surface of said mixing chamber.

22. The method defined in claim 21, wherein said oxidizer is a halogen and said first temperature is in the range of 200–300° C.

23. The method defined in claim 22, wherein said oxidizer is fluorine.

References Cited

UNITED STATES PATENTS

| | | | |
|---|---|---|---|
| 2,874,539 | 2/1959 | Fox | 60—211 XR |
| 3,071,924 | 1/1963 | Carr | 60—207 |
| 3,158,993 | 12/1964 | Hodgson | 60—214 |
| 3,203,171 | 8/1965 | Burke et al. | 60—211 |
| 3,254,485 | 6/1966 | Bernstein | 60—213 XR |
| 3,350,887 | 11/1967 | Leunig et al. | 60—208 XR |

BENJAMIN R. PADGETT, Primary Examiner

U.S. Cl. X.R.

60—207, 208, 211